S. R. Smith,
Saw-Mill Head-Block.
No. 80,514. Patented July 28, 1868.
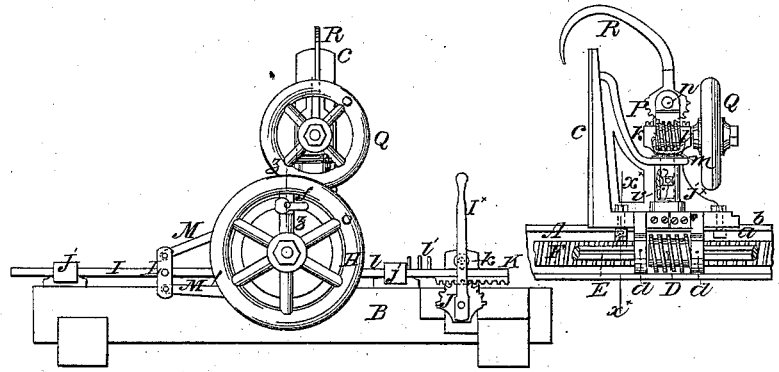
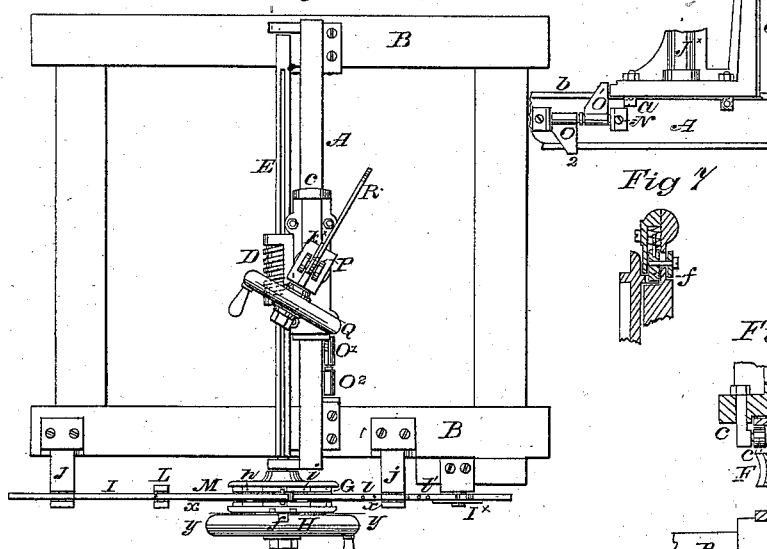
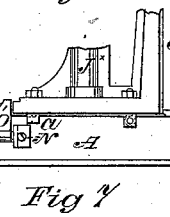
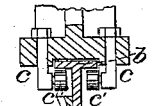
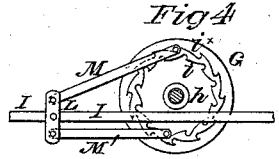
Witnesses:
Theo Tusche
Wm Trewin
Inventor:
S. R. Smith
Per Munn & Co
Attorneys

UNITED STATES PATENT OFFICE.

SAMUEL R. SMITH, OF CINCINNATI, OHIO, ASSIGNOR TO P. P. LANE AND JOS. T. BODLEY, OF SAME PLACE.

IMPROVEMENT IN HEAD-BLOCKS FOR SAW-MILLS.

Specification forming part of Letters Patent No. 80,514, dated July 28, 1868.

*To all whom it may concern:*

Be it known that I, SAMUEL R. SMITH, of Cincinnati, in the county of Hamilton and State of Ohio, have invented a new and Improved Head-Block for Saw-Mills; and I do hereby declare that the following description, taken in connection with the accompanying drawings, hereinafter referred to, forms a full and exact specification of the same, wherein I have set forth the nature and principles of my said improvements, by which my invention may be distinguished from all others of a similar class, together with such parts as I claim and desire to have secured to me by Letters Patent.

This invention relates to a new and improved head-block for saw-mills; and it consists in a novel mechanism for moving or adjusting the knee of the head-block, and also consists in an improved means for dogging the log, together with other parts, hereinafter fully shown and described, whereby a very simple and efficient device for the purpose specified is obtained.

In the accompanying sheet of drawings, Figure 1 is a side view of my invention; Fig. 2, a plan or top view of the same; Fig. 3, a detached side view of the knee and dog pertaining to the same; Fig. 4, a section of a portion of the same, taken in the line $x\,x$, Fig. 2; Fig. 5, a section of a portion of the same, taken in the line $y\,y$, Fig. 2; Fig. 6, an inner side view of a wheel on the main shaft; Fig. 7, a section of a portion of the device, taken in the line $z\,z$, Fig. 2; Fig. 8, a side view of a portion of the base-piece and a portion of the knee thereon; Fig. 9, a section of Fig. 3, taken in the line $x'\,x'$.

Similar letters of reference indicate like parts.

A represents a base-piece, which is of I form in its transverse section, and is supported at its ends upon the two rails B B of the carriage, and secured in position by gains cut into the rails, or by parallel pieces attached thereto, and between which the feet of the base-piece rest. Upon this base-piece A a knee, C, is placed and allowed to slide freely, having at its rear end hook-bolts $a\,a$, which catch beneath the upper flange, $b$, of the base-piece, and at the forward end hooked studs $c$, with a revolving roll, $c'$, each of which travels beneath the same flange $b$ and admit of the knee moving freely when pressed upon by a round log, or bound by the dog hereinafter described.

From one side of the knee C depends a housing composed of two separate pieces, $d\,d$, between which a short screw, D, having a coarse pitch, revolves upon journals turned at either end of it, and fitting in a corresponding box at either side of the housing. A grooved shaft, E, communicates motion to this screw, which engages with a concave rack, F, at the side of the base-piece A, (see Fig. 3,) and is connected with shaft E by a feather, so that while said shaft is made to turn the screw the latter is allowed to travel on the former.

At the rear end of the base-piece a journal-box, $e$, supports the shaft E, which beyond has upon it revolving loosely a ratchet-wheel, G, and beyond that a hand-wheel, H; keyed fast and provided with a catch, $f$, to engage with any of a series of notches in an annular ledge, $g$, on the outer side of the ratchet-wheel G, and connect the latter to the hand-wheel H, when desired. (See Figs. 5, 6, and 7.)

The ratchet-wheel G consists of two flanges, $h\,h$, secured rigidly to one hub, and having each a double series of ratchet-teeth, $i\,i^x$, on the inner face, as shown in Fig. 4, the one set, $i$, looking outwardly and the other set, $i^x$, looking inwardly, and the spaces between one series being intermediate to those of the other series, so as to bring the working parts on or near the same circle. The ratchet-wheel G may, however, consist of one flange with external and annular teeth upon it, as described, and one plain flange; or the external teeth may be upon one flange and the annular teeth upon the other; or it may consist of only one flange with external and annular teeth upon both sides, or upon one side only, or the external teeth may be upon one side and the annular teeth upon the other. If only one flange is used the pawls M M', hereinafter spoken of, would have to be forked to embrace the wheel. In any case the face of the teeth against which the pin projecting from the pawls M M' operates should be hooked or overhanging, that the wheel may be operated through a greater arc of a circle than would otherwise be possible.

I is a reciprocating bar, supported in bearings $j$ at the side of the carriage, and operated by means of a lever, I$^x$, attached to a pinion or toothed segment, J, and an inverted rack, K, at the under side of the bar, the rack being held in gear with the pinion or segment by means of a roll, $k$, revolving upon a stud. The extent of the movement of the bar I is graduated at will by means of a fixed pin, $l$, and an adjustable pin, $l'$, the latter being fitted in any of a series of holes in the bar I, the fixed pin $l$ coming in contact with one side of a stop or obstruction, which may be one of the bearings $j$, and the other pin, $l'$, coming in contact with the other side thereof. The reciprocating motion of the bar I, by means hereinafter described, advances the knee C of each head-block upon the carriage equally and simultaneously toward the saw, and the holes for the movable pin $l$ are so graduated that each space represents one tooth upon the ratchet-wheel and a definite fraction of an inch in advancement of the knee, and the operator may by a judicious adjustment of the pin $l$ and manipulation of the lever $I^x$ alter the thickness of the lumber sawed, as occasion may require, at each succeeding cut, if necessary.

At intervals corresponding to the seats upon the carriage provided for the head-block, holes are drilled through the bar I to attach a vertical cross-head, L, thereto, to the upper end of which a pawl, M, is pivoted, which engages with the external teeth of the ratchet-wheel G above its center, (see Fig. 4,) and to the lower ends of which another pawl, M', is pivoted, which engages with the annular teeth of the ratchet-wheel G beneath its center. It will be seen that by this means the reciprocating motion of the bar I will give a continuous rotary motion to the ratchet-wheel G, and consequently to the screw, and cause the knee C to advance definitely toward the saw. The same result would be attained in an analogous manner were the two flanges of which the ratchet-wheel G is composed provided with teeth on their peripheries only, and corresponding annular grooves turned in the inner faces of each, near the periphery, in which the pin that projects from either side of the pawls M M' should work, and a pawl pivoted thereto engage with the teeth upon the periphery, the pawls beneath the wheel requiring a counter-balance.

By disconnecting the hand-wheel H from the ratchet-wheel G the knee C may be moved back. If the ratchet-wheel G is fixed upon the shaft E, the hand-wheel H forming an integral part thereof, the retraction of the knee C is rendered possible by raising both pawls M M' from the ratchet-wheel G, which may be accomplished by a movement of a lever provided with lugs or fingers projecting beneath each pawl M M', and properly arranged for slightly lifting them when thrown into the position denoted by the dotted lines.

On the opposite side of the base-piece A from where the rack F is secured there is a shaft, N, on which two or more loose plates or arms, O, are fitted. (See Fig. 8.) These plates or arms are numbered, and so located that when any one of them is thrown upward it will arrest the backward movement of the knee. The plates or arms of each head-block on a carriage all correspond in position, and hence it will be seen that if the plate or arm of a certain number on each head-block be turned upward the knees of the several blocks will all be moved back in line with each other. This insures a correct relative position of the knees and an expeditious setting of the same.

At the back of the knee C there is a vertical box, $j^x$, in which a vertical shaft, V, is fitted in such a manner that it may rotate freely, but have no vertical motion, and at its upper end there is a box, $k^x$, in which a horizontal shaft, $l'$, is fitted and allowed to rotate freely, said shaft having a screw-thread, $m$, cut upon it, into which a segment, P, gears. (See Fig. 3.)

On the outer end of the screw-shaft $l'$ there is a hand-wheel, Q. The segment P is hung upon a shaft, $n$, above the screw-shaft $l$, and to this segment a goose-neck, R, is secured, terminating in a sharp point and made to serve the office of a dog, which may be raised or lowered by turning the screw-shaft $l$, and may be turned laterally by turning shaft V.

In constructing this dog a lever may be substituted in place of the screw $m$, and the same result obtained, yet the screw is preferred as affording most leverage. This dog, arranged and operated as shown, may be forced into the log and forcibly held there without dependence upon the friction or binding of the wood in which it is thrust, and may be removed without the necessity of handling an ax or maul—matters of consequence in a lumber-mill as expediting business. Swinging upon its rotating shaft V, the dog may reach far over upon the top of a round log, or, turned obliquely to either side, it may be inserted close to the edge of a squared log, so as to be out of the way of the saw when the last cut shall leave but an inch-board upon the head-block.

I am aware that dogs to be thrust and held by pressure have been heretofore used for holding the last board; but they have been merely accessory to dogs of the common construction, that were the main dependence for holding the log, but were liable to get loose, when holding the last board, and fall into the saw.

Having thus described my invention, what I claim as new, and desire to secure by Letters Patent, is—

1. The ratchet-wheel G, containing both external and annular teeth, the pawls M M', and reciprocating bar I, all constructed and operating substantially as and for the purpose described.

2. The combination of the wheel Q, worm-wheel $m$, and toothed segment P to operate the dog R, as herein described, for the purpose specified.

3. The plates O, when constructed and operating in the manner substantially as described.

Witnesses:     SAMUEL R. SMITH.
OLIVER BRITT,
EDWARD MYERS.